United States Patent [19]

Ruehl et al.

[11] Patent Number: 4,833,018
[45] Date of Patent: May 23, 1989

[54] MAGNETIC, HOT-MELT ADHERING SOUNDPROOFING SHEET

[75] Inventors: Karl Ruehl, Bad Nauheim; Karlheinz Bildner, Rodenbach, both of Fed. Rep. of Germany

[73] Assignee: Ruetgerswerke Aktiengesellschaft, Frankfurt am Main, Fed. Rep. of Germany

[21] Appl. No.: 174,870

[22] Filed: Mar. 29, 1988

[30] Foreign Application Priority Data

Apr. 8, 1987 [DE] Fed. Rep. of Germany ....... 3711810

[51] Int. Cl.⁴ .................. C09J 7/02; B32B 11/04; B32B 15/08
[52] U.S. Cl. .................................. 428/332; 428/349; 428/457; 428/480; 428/489; 428/900
[58] Field of Search ............... 428/489, 900, 349, 457, 428/480, 332

[56] References Cited

U.S. PATENT DOCUMENTS

| | | | |
|---|---|---|---|
| 3,243,374 | 3/1966 | Gillard | 428/900 X |
| 4,559,252 | 12/1985 | Motoda et al. | 428/489 X |
| 4,636,414 | 1/1987 | Tajima et al. | 428/489 X |

*Primary Examiner*—Thomas J. Herbert
*Attorney, Agent, or Firm*—Beveridge, DeGrandi and Weilacher

[57] ABSTRACT

Bubble-formation when melting a magnetically adhering bituminous soundproofing sheet provided with a hot-melt adhesive layer (4) onto an automobile body sheet metal at temperatures of about 190° C., is prevented by integrating a flexible, temperature-resistant foil (5) into the soundproofing sheet. For soundproofing sheets up to 3 mm thick, the spacing between the hot-melt layer (4) and the foil (5) preferably should not exceed 1 mm.

6 Claims, 1 Drawing Sheet

MAGNETIC, HOT-MELT ADHERING SOUNDPROOFING SHEET

INTRODUCTION AND BACKGROUND

The present invention concerns a bituminous soundproofing sheet provided on its underside with a bitumen-compatible hot-melt adhesive and containing magnetic or magnetizing particles.

Illustratively, soundproofing sheets are known in the art and are used in automobiles to soundproof body parts. Known products are characterized in that either their construction is homogeneous with uniform distribution of the magnetic particles, or they are built up in a sandwich construction in the manner of a magnetic and a soundproofing layer. On the top side, such sheets may be laminated or coated with antiblocking means. To improve soundproofing, the bitumen used as a rule is modified with plastics or synthetic resins and organic filters. The magnetic particles, which can be for instance ferrite powder, allow preliminary positioning of the soundproofing sheet during assembly and fixing it in place until there is fusion with the support and renewed bonding of the hot-melt adhesive while passing through the oven wherein the temperatures may rise up to 190° C.

An example of such prior known construction is in U.S. Pat. No. 3,243,374.

This known soundproofing sheet suffers from the drawback that air bubbles trapped between the hot-melt adhesive layer and the lower support layer can expand unhampered on account of the high temperatures and lowered viscosities of the bituminous substances, whereby good bonding between the sheet and the supporting layer is hampered in part. This affects the soundproofing capability of the sheet adversely.

Accordingly, a problem had to be overcome in developing a magnetically adhering bituminous soundproofing sheet that would be free from bubble formation even after passing through the oven.

SUMMARY OF THE INVENTION

In accordance with the present invention, there is provided a soundproofing sheet including a flexible foil that is thermally resistant at least up to 190° C. and a hot-melt adhesive layer, wherein the flexible foil is over top of the hot-melt adhesive layer. In further detail, this flexible foil is formed of a heat-resistant plastic such as polyester. However, metal foils also may be used.

BRIEF DESCRIPTION OF THE DRAWINGS

The invention will be further understood with reference to the drawings, wherein.

DETAILED DESCRIPTION OF THE INVENTION

Figure 1:
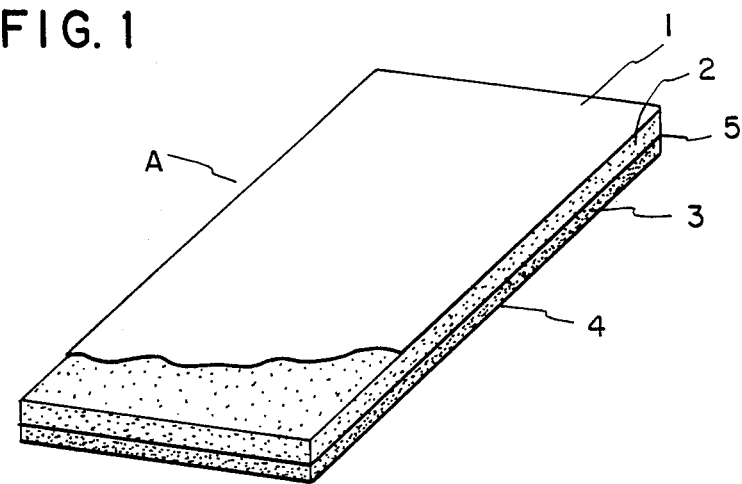
FIG. 1 is a perspective view of the soundproofing layer of the present invention.
Figure 2:
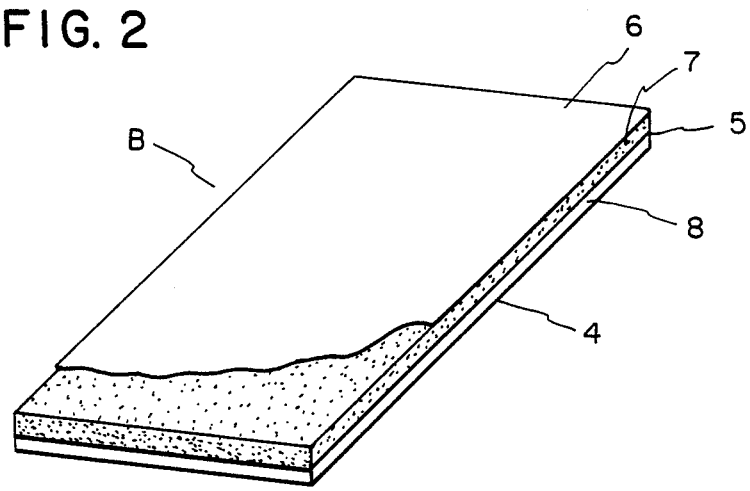
FIG. 2 is a perspective view of another embodiment of the present invention.

As shown in FIGS. 1 and 2, the soundproofing sheet of the present invention (A) and (B) is formed of a plurality of discrete layers or laminae. A feature of the invention resides in a flexible foil (5) that is thermally resistant to elevated temperatures, i.e. up to at least 190° C., and which is located above a layer (4) of hot-melt adhesive.

It was found that for soundproofing sheets up to 3 mm in thickness, bubble formation can be prevented especially effectively if the spacing between the flexible foil layer (5) and the hot-melt adhesive layer (4) does not exceed 1 mm. In thicker soundproofing sheets, bubbles or craters will form if this spacing relationship exceeds 50% of their thickness. Preferably therefore the spacing shall not exceed 30% of the thickness of the soundproofing sheet.

Fabrics, non-woven materials and similar reinforcing linings cannot effectively prevent bubble formation.

When flexible sheets with low stretching features are used, the loss factor is also increased. This improves the sound dampening properties of the soundproofing sheet.

The invention is discussed in further detail in relation to FIGS. 1 and 2. FIG. 1 shows a soundproofing sheet with the magnetic particles being homogeneously distributed and FIG. 2 shows such a sheet with separate magnetic and soundproofing layers.

In a soundproofing sheet of 4 mm thickness as shown in FIG. 1, there is laminated on the top a polyethylene foil (1). Immediately beneath this foil (1) there is a first soundproofing layer (2) approximately 2.7 mm in thickness and containing finely divided ferrite powders dispersed therein and consisting of 40% of weight of barium or strontium ferrite, 30% by weight of elastomer-modified bitumen (styrene-butadiene-styrene rubber) and 30% by weight of mica and slate dust. Beneath this layer, in turn, there is the flexible foil layer (5) which can be in the form of an aluminum foil and which, in turn, is followed by a second soundproofing layer (3) about 1.3 mm in thickness and containing a ferrite powder dispersed therein of the same composition as the first soundproofing layer (2). Layer (3) is coated on its underside with a bitumen-compatible adhesive layer (4) melting between 120° and 160° C.

FIG. 2 shows another embodiment of a soundproofing sheet of the inention which is provided on its top surface with a bitumen-compatible antiblocking layer (6) which is solid below 90° C. The soundproofing layer proper (7) is located immediately below and consists of 20 to 50% by weight bitumen, 2 to 6% by weight a copolymer and 44 to 78% by weight inorganic filler. This soundproofing layer (7) is bonded to the magnetic or magnetizing layer (8) consisting of 20 to 50% bitumen and 50 to 80% by weight finely divided ferrite powder dispersed in the bitumen. The ferrite particles are made into permanent magnets by means of a strong magnetic field after the composite sheet has been produced. A bitumen-compatible adhesive layer (4) melting between 120° and 190° C. is deposited on the underside of the magnetic layer (8). A flexible foil (5) such as polyester is present between the soundproofing layer (7) and the magnetic layer (8).

Preferably, the ferrite powders consist of the known barium and strontium ferrites in finely divided form. Besides the conventional fillers such as mica, barites and slate dust, in particular hollow silicate microballs and inorganic fibers are introduced alone or mixed with the known fillers into the soundproofing sheet. The particle size of the ferrites is below 0.3 mm (greater than 0.3 mm no more than 1%, 0.18 to 0.3 mm 3%, 0.1 to 0.18 mm 15%).

Any kind of inorganic fibrous filler can be used. However, the filler need not be fibrous. The fillers are only in layers 2 and 7.

In the preferred embodiment, the soundproofing sheet contains a strongly magnetic or magnetizing layer between 0.3 and 1 mm in thickness. The thickness depends on the surface weight and the ferrite proportion. Layer thicknesses below 0.3 mm cannot be produced uniformly on an industrial scale. A soundproofing composite sheet between 2 and 3 mm in overall thickness meets most requirements of the automobile industry. Preferably polyvinyl chloride (PVC) based dispersions are used for the hot-melt adhesive and the antiblock means. Vinyl polymer compositions of this type are well known in the art. In addition to PVC, other hot-melts may be used for the top layers, such as polyacrylates or polyvinylacetates.

The effectiveness of the soundproofing sheet of the invention is illustrated in the representative Example below, without thereby restricting the invention to the formulations shown.

EXAMPLE 70 parts by weight of barium ferrite powder with a grain size less than 0.3 mm are homogeneously mixed with 30 parts by weight if bitumen B 45 and the mixture is cast by a sheet casting machine into a 0.9 mm thick layer that is then covered by a 12 micron thick aluminum foil. A strong soundproofing layer 1.6 mm in thickness consisting of a homogeneous mixture of 43 parts by weight bitumen B 45, 2 parts by weight acrylic acid ester and 2 parts by weight polyvinylacetate, said mixture further incorporating 22 parts by weight of mica and 31 parts by weight barites, is then poured over the above structure. The soundproofing sheet resulting therefrom is coated on its underside with 50 g/m² and on its topside with 30 g/m² of a hot-melt PVC dispersion. The weight of the finished composite soundproofing sheet is 3.15 kg/m².

The table below compares the loss factors according to DIN 53,440 that were measured by the resonance curve of the 1st order at various temperatures on the sheet of the invention and of this Example and compared with a corresponding sheet made without the inserted aluminum foil.

TABLE

| | DIN 53,440 loss factor (2nd order resonance curve) | |
|---|---|---|
| Test Temperature (°C.) | Sheet of the Invention surface weight 4.5 kg/m² | Control Sheet |
| −20 | 0.085 | 0.07 |
| −10 | 0.14 | 0.11 |
| 0 | 0.19 | 0.155 |
| 10 | 0.24 | 0.20 |
| 20 | 0.245 | 0.205 |
| 30 | 0.18 | 0.16 |
| 40 | 0.105 | 0.10 |

Contrary to the case for the control sheet, the fusion of the soundproofing sheet of the invention onto a steel plate at 190° C. causes no bubbles. To prepare the soundproofing layer itself, a bitumen is mixed with a suitable thermoplastic resin compatable with the bitumen. The resulting mixture should have high stability against slipping when heated up to 190° C. For example, polypropylene, polyethylene or styrene-butadiene-styrene rubber alone or in combination may be used.

Comparable results are obtained when replacing the aluminum foil with a polyester foil. Preferably, the polyester foil has a high heat resistance up to 190° C. A suitable foil of this type is produced by KALLE 12. 10–3 mm thick, type Hostapham RN 12.

Further variations and modifications of the foregoing will become apparent to those skilled in the art and are intended to be encompassed by the claims appended hereto.

German priority application P 37 11 810.2 is relied on and incorporated by reference.

We claim:

1. A soundproofing sheet formed of a plurality of layers, at least one layer comprising bitumen, mineral fillers, ferrite powder, said layer having an underside and a top side, said top side being coated with a laminae or coating of a thermoplastic material, the underside being adhered to a flexible foil which is heat-resistant at least up to 190° C., an intermediate layer of soundproofing and/or magnetic material, said sheet having an underside which is coated with a bitumen-compatible hot-melt adhesive.

2. The soundproofing sheet according to claim 1, wherein the flexible foil is a metal foil.

3. The soundproofing sheet according to claim 1, wherein the flexible foil is a polyester foil.

4. The soundproofing sheet according to claim 1, wherein the intermediate layer is located between the hot-melt adhesive layer and the flexible foil and does not exceed 50% of the thickness of the soundproofing sheet.

5. The soundproofing sheet according to claim 1, wherein the intermediate layer is located between the hot-melt adhesive layer and of flexible foil and does not exceed 30% of the thickness of the soundproofing sheet.

6. The soundproofing sheet according to claim 1, wherein the intermediate layer is located between the hot-melt adhesive layer and the flexible foil and does not exceed 1 mm.

* * * * *